United States Patent

[11] 3,591,169

| [72] | Inventor | Friedrich Preuss |
| | | Offenbach am Main, Germany |
| [21] | Appl. No. | 800,879 |
| [22] | Filed | Feb. 20, 1969 |
| [45] | Patented | July 6, 1971 |
| [73] | Assignee | Roland Offsetmaschinenfabrik Faber & Schleicher A G |
| | | Offenbach am Main, Germany |
| [32] | Priority | Feb. 28, 1968 |
| [33] | | Germany |
| [31] | | P 16 11 376.1 |

[54] SHEET TRANSFER DEVICE FOR A PRINTING PRESS
4 Claims, 6 Drawing Figs.

[52] U.S. Cl. ..................................................... 271/50, 271/79
[51] Int. Cl. ..................................................... B65h 9/12
[50] Field of Search ........................................... 271/79, 82, 69, 50, 45, 53; 101/183, 184; 198/183

[56] References Cited
UNITED STATES PATENTS

| 2,138,405 | 11/1938 | Huck .............................. | 271/79 X |
| 3,167,006 | 1/1965 | Peyrebrune ................. | 271/50 X |

FOREIGN PATENTS

| 304,032 | 1/1929 | Great Britain ................ | 271/79 |

Primary Examiner—Joseph Wegbreit
Attorney—Hane & Baxley

ABSTRACT: A device for delivering sheets to a printing unit of a printing press, transfers sheets to a transfer drum of the press by means of a gripper carrier movably mounted on an endless chain conveyor. The carrier is accurately locked in its transfer position with reference to the drum by a leading clamp and a trailing clamp. Such accurate positioning of the carrier is effected by activating the leading clamp prior to the carrier reaching its transfer position thereby limiting further movement of the carrier. The accurate positioning of the carrier is further assured by the engagement of mating surfaces on the carrier and the drum.

Inventor:
FRIEDRICH PREUSS

Inventor:
FRIEDRICH PREUSS
BY Hane and Baxley
ATTORNEYS

Inventor:
FRIEDRICH PREUSS

BY Hane and Baxley
ATTORNEYS

SHEET TRANSFER DEVICE FOR A PRINTING PRESS

The invention relates to a device for transferring sheets to printing units of a printing press in accurately aligned positions and more particularly, the invention relates to a device of this kind in which carriers carrying suitable sheet grippers are movably mounted on endless chain conveyors and the carriers have locating surfaces engaging corresponding locating surfaces on sheet transfer drums of the printing press when the carriers reach the sheet transfer position, the carriers being thereupon locked to the drums by clamps movable relative to each other.

BACKGROUND

The purpose of sheet transfer devices of the general kind above referred to is to assure that the device occupies during each sheet transfer a definite fixed position with respect to the sheet transfer drum and the impression cylinder synchronously rotating with the drum. To achieve such definite fixed position of the gripper carrier locating thereof must be effected independent of the chain conveying the carriers as such chain conveyors have a tendency of gradually stretching during use which in turn causes displacements in the positions of the gripper carriers.

There is known a sheet transfer device, for instance, from U.S. Pat. No. 2,425,680, issued Aug. 12, 1947, in which the gripper carriers have locating surfaces coacting with corresponding locating surfaces on the transfer drum. The location of the carriers with respect to the drums is fixed by engagement of the locating surfaces and not adjustable. The carriers are secured in the transfer position as determined by the locating surfaces by mutually movable clamps simultaneously operated by a single control link. The position of this link with respect to the gripper carriers is freely movable so that it will adjust itself to the position of a gripper carrier as it comes in contact with the same.

Controlling the position of a gripper carrier by locating surfaces which are spatially fixed with reference to each other has the disadvantage that even comparatively slight manufacturing tolerances as they are in practice not avoidable even with precision machining, automatically and immediately manifest themselves in inaccuracies of the alignment of the sheets when being transferred to the transfer drum. As is well known, even very slight misalignments cause a serious deterioration of the quality of multicolor printing. Moreover, the aforediscussed device requires a generally V-shaped recess to fix the transfer position of the gripper carriers and accurate locating and machining of such recesses is also comparatively expensive.

THE INVENTION

It is a broad object of the invention to provide a novel and improved sheet transfer device of the general kind above referred to which assures an accurately fixed position of the gripper carriers during the transfer of sheets without requiring expensive and complex components.

SUMMATION OF THE INVENTION

The aforepointed-out object, feature and advantage of the invention and other objects, features and advantages which will be pointed out hereinafter and are set forth in the appended claims constituting part of the invention are obtained by activating the leading clamp as seen in the rotational direction of the transfer drum prior to the run-in of the gripper carrier into the transfer position with respect to the drum, thereby limiting the run-in movement of the gripper carrier. Accordingly, location of the gripper carrier position is effected by a movable stop member in the form of the leading clamp. As is evident, location of the carrier in this manner does not present any manufacturing problems and there is no appreciable increase in costs as the clamp used as stop member must be provided in any event to effect locking of the carrier to the drum.

According to an advantageous embodiment of the invention, the locating surfaces on the gripper carrier and the transfer drum are cylindrically curved. Such curvatures can be machined on a lathe which is very convenient and economical from a manufacturing viewpoint. Very high tolerances can be obtained at comparatively low costs.

The invention also provides that the active or clamping position of the leading clamp is adjustable. As a result, the clamp can be adjusted even after mounting the same so that fine adjustment of the gripper carrier position can be conveniently effected and wear and tear can be compensated without difficulty.

In the accompanying drawing, an embodiment of the invention is shown by way of illustration and not by way of limitation.

Figure 1:
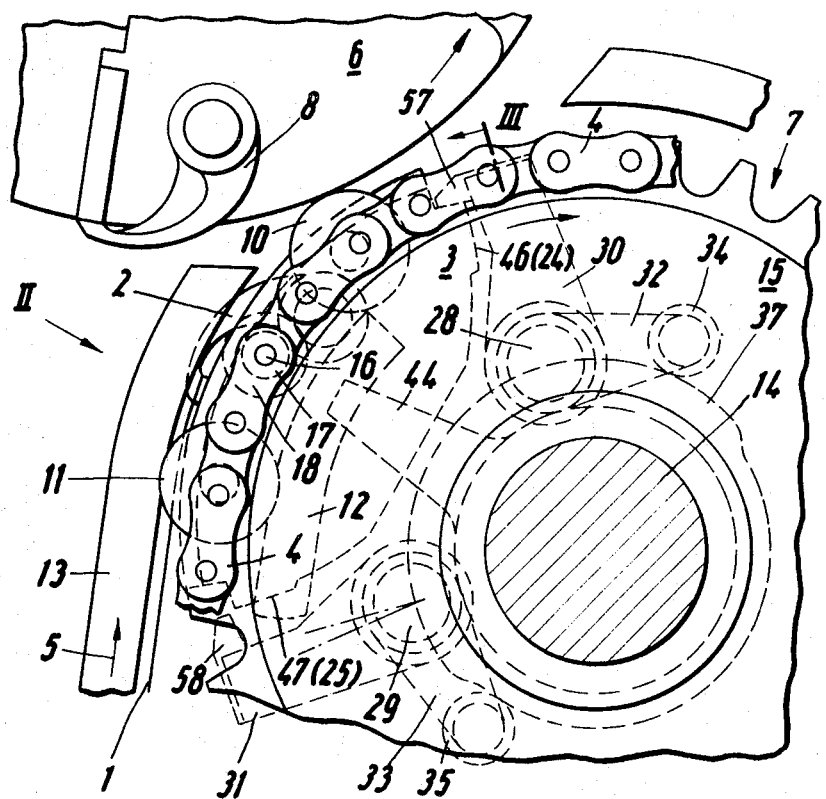
FIG. 1 is an end view of a sheet transfer drum coacting with an impression cylinder.

Referring now to the figures more in detail, the illustrated embodiment exemplifies the transfer of a sheet 1 from a first printing unit to a second printing unit of a printing press (not shown). To this end, the sheet to be transferred is held by a gripper 2 mounted on a gripper carrier 3. A plurality of such gripper carriers are mounted on endless conveyor chains 4 and carried by the same from one printing unit to another.

The illustrated gripper carrier 3 should be visualized as being conveyed in the direction of arrow 5 and is shown in the position in which it just runs into the transfer drum 7 rotating in synchronism with a printing cylinder 6 to effect transfer of the respective sheet 1 to a gripper 8 on cylinder 6.

At the moment at which the sheet transfer is effected the leading edge and the side edges of the sheet and thus the gripper carrier 3 itself must occupy a definite position with respect to cylinder 6 and hence, with respect to grippers 8 thereon, to assure accurate alignment or registry of the sheet. Such accurate location of the gripper carrier cannot be obtained by the endless chain conveyor 4. As stated before, the conveyor chains have a tendency to stretch, especially after a prolonged period of use. Guide rolls 10 and 11 mounted on the face sides 9 of carrier 3 guide the carrier along guide rails 12 and 13. In this connection it should be pointed out that FIG. 2 shows only one end of the gripper carrier and FIG. 3 only one end of transfer drum 7, as the other ends of these components are symmetrically shaped.

Figure 2:
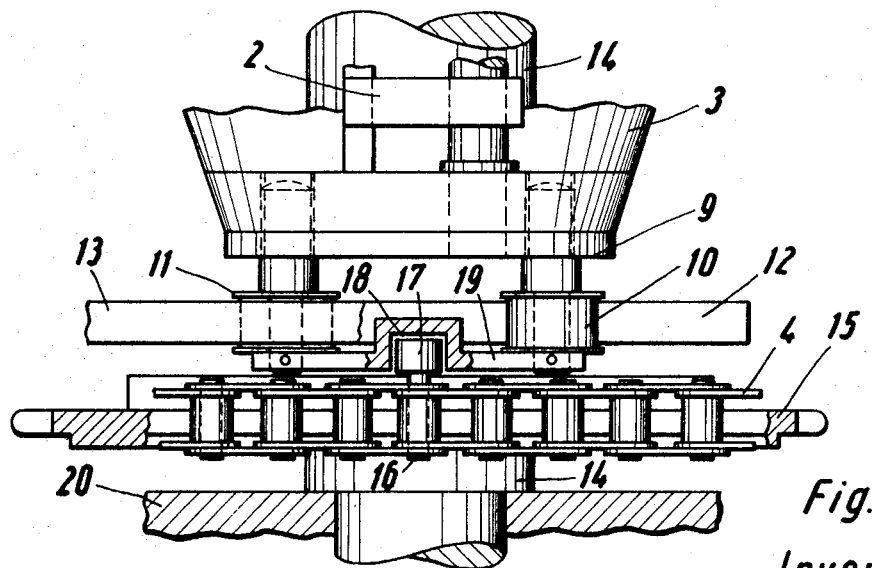
FIG. 2 is a fragmentary view of the transfer drum as seen in the direction of arrow II of FIG. 1.

The chain conveyor 4 is driven by chain wheels 15 secured on a shaft 14 seating transfer drum 7 and transport of the gripper carriers is effected by providing on a chain bolt 16 a rotary roller 17 engaging a recess 18 formed in a bracket 19 secured to the gripper carrier, as is clearly shown in FIG. 2 thereby positively coupling gripper carrier 3 and the endless chain conveyor 4, ample play being provided between the gripper carrier and the chain and also guide rails 12 and 13.

Figure 3:
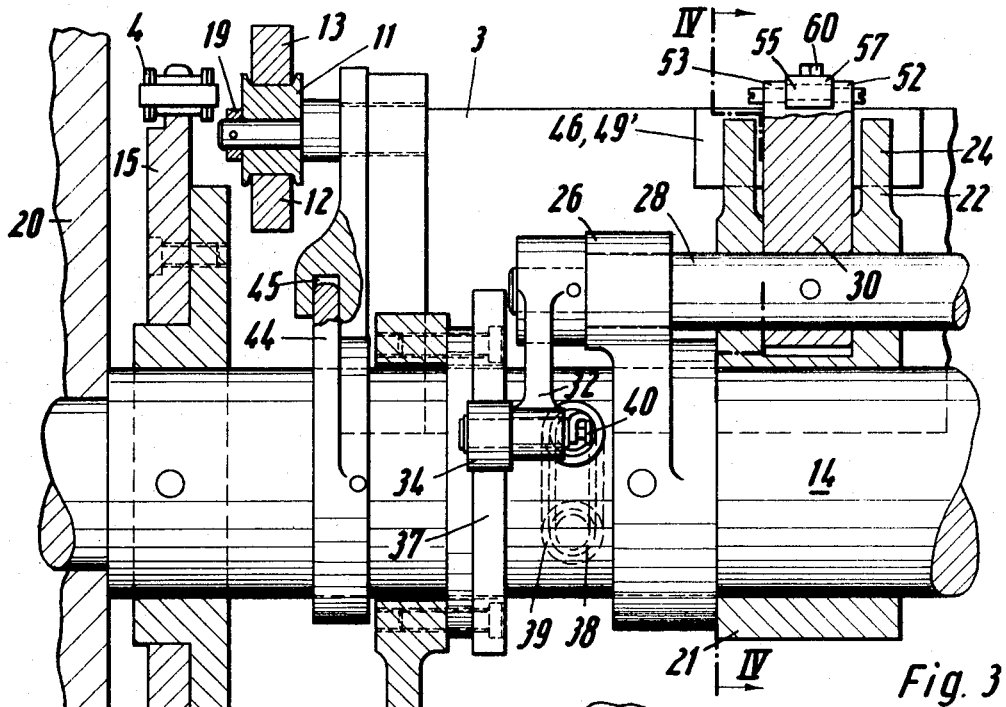
FIG. 3 is a view of the transfer drum, partly in section, in the direction of arrow III of FIG. 1.
Figure 4:
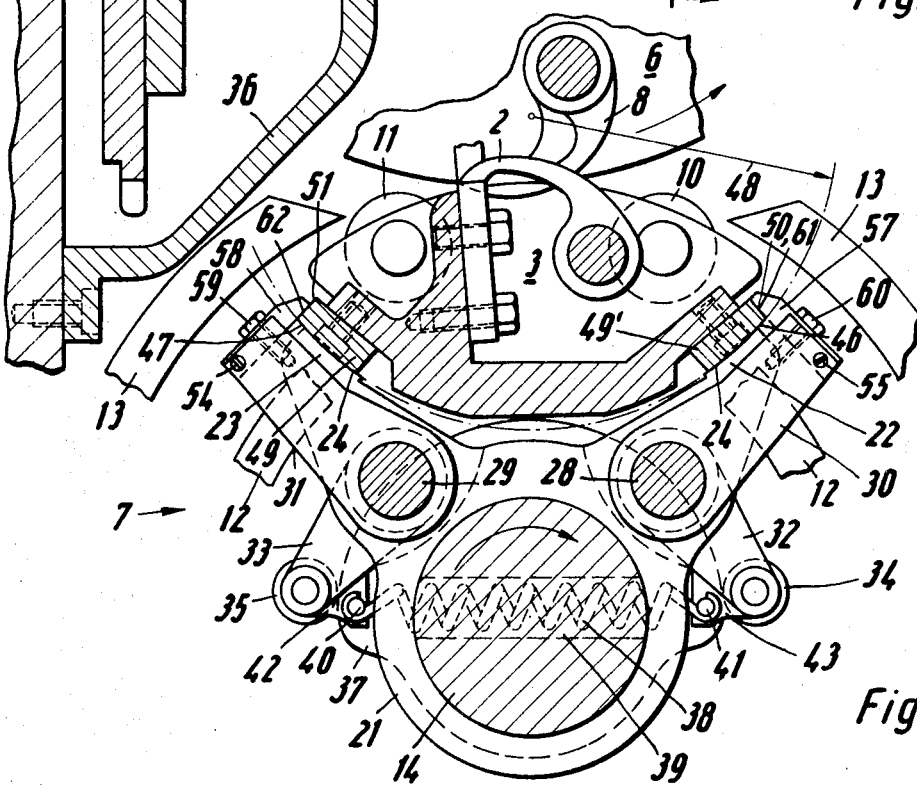
FIG. 4 is a section of the transfer drum taken on line IV–IV of FIG. 3, the gripper carrier being shown in the sheet transfer position.

According to FIGS. 3 and 4, a holder 21 is pinned or keyed to drum shaft 14, which in turn is journaled in the frame structure 20 of the press. The holder has two arms or forks 22 and 23 terminating in cylindrically curved locating surfaces 24 and 25. Shafts 28 and 29 are journaled in arms 22 and 23 of holder 21 and bearing blocks 26 (see FIG. 3) pinned or keyed to drum shaft 14. These shafts have clamps 30 and 31 and arms 32 and 33 pinned or keyed thereto. The arms 32 and 33 mount followers 34 and 35 riding on a stationary cam disc 37 which is fixedly secured to frame 20 by suitable fastening means such as a bracket 36. As is evident, clamps 30 and 31 will preform a pivotal movement about the rotational axis of shafts 28 and 29 respectively when drum shaft 14 is rotated, the extent and direction of such angular movement being controlled by the configuration of the cam surface of cam disc 37. Followers 34 and 35 are held in engagement with the cam disc by a tension spring 38 which extends through a bore 39 in drum shaft 14 and is secured at its ends in bolts 40 and 41 which in turn are held by suitably shaped extensions 42 and 43 of cam follower arms 32 and 33 respectively.

Drum shaft 14 has further pinned or keyed thereto a dog or protrusion 44 (see FIG. 3) which is engageable with a slot 45 in gripper carrier 3 and thereby fixes the position of the gripper carrier in the axial direction of drum shaft 14. Only one such dog or projection is provided on the drum shaft. Hence, the other end of the drum shaft, which is not shown in FIG. 3 to simplify the illustration, does not have such dog.

The bottom side of the gripper carrier is formed with two locating surfaces 46 and 47. These surfaces are cylindrically curved with a radius 48 equal to the radius of locating surfaces 24 and 25 on arms 22 and 23 respectively of holder 21 pinned to drum shaft 14. The locating surfaces 46 and 47 are formed on plates 49 and 49' which are secured to the gripper carrier 3, for instance, by screws, so that the surfaces 50 and 51 of plates 49 and 49' relative to each other and also relative to all gripper carriers travelling between two printing units occupy the same spatial positions.

The free ends of clamps 30 and 31 terminate in forks 52 and 53 (FIG. 3) and pins 54 and 55 respectively, one for each clamp, extend across the forks rotatable therein. An abutment block 57 and 58 respectively, is seated upon the midportion of each pin. These midportions have an eccentric cross section with respect to the rotational axis of the pins and accordingly, blocks 57 and 58 can be adjusted a small distance toward or away from gripper carrier 3 by rotating the pins. After adjustment of the blocks as desired, the same are locked in position on the clamps 30 and 31 respectively, by suitable fastening means such as screwbolts 60 and 59 threaded through blocks 57 and 58 respectively. The blocks have abutment surfaces 62 and 61 respectively, which are engageable with surfaces 51 and 50 of plates 49 and 49' respectively, and are slightly slanted with respect to the direction of displacement of the blocks.

The sheet transfer device as hereinbefore described operates as follows:

As a gripper carrier 3 moves in clockwise direction toward the position in which it transfers the gripped sheet to transfer drum 7 the clamp as seen in the rotational direction of the transfer drum, to wit, leading clamp 30, is pivoted due to the configuration of the cam surface of cam disc 37 in counterclockwise direction. The trailing clamp 31 remains for the time being in the open or nonclamping position. The gripper carrier driven by chain 4 and guided by rails 12 and 13 continues its run-in toward transfer drum 7. However, the movement of carrier 3 is now limited by abutment block 57 of leading clamp 30. As the rotation of drum 7 continues the gripper carrier engages with its locating surfaces 46 and 47 the mating surfaces 24 and 25 on arms 22 and 23 respectively. The trailing clamp 31 is now pivoted in clockwise direction in accordance with the configuration of the cam surface of disc 37, thereby fixedly locking carrier 3 to transfer drum 7.

Prior to such locking, dog 44 pinned to transfer drum 14 has engaged slot 45 in carrier 3, thus locking the carrier in the axial direction of drum shaft 14 also.

Accordingly, the location of gripper carrier 3 is now fixed in the circumferential direction of the drum shaft by abutment block 57 and in the radial direction of the drum shaft by dog 44 when and while sheet 1 is transferred to gripper 8 of printing cylinder 1.

FIG. 4 shows the sheet transfer device in the position in which the gripper carrier 3 transfers a sheet to transfer drum 7. Accordingly, both clamps 30 and 31 are in the clamping position.

Figure 5:
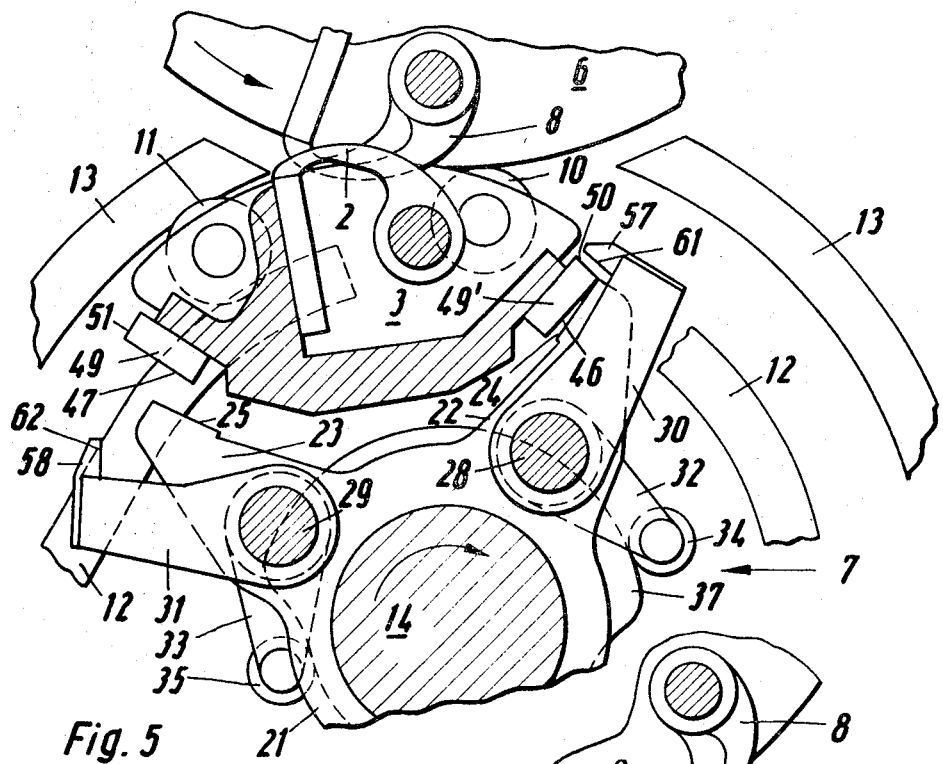
FIG. 5 is a section similar to FIG. 4, but the gripper carrier being shown just before the transfer of a sheet.
Figure 6:
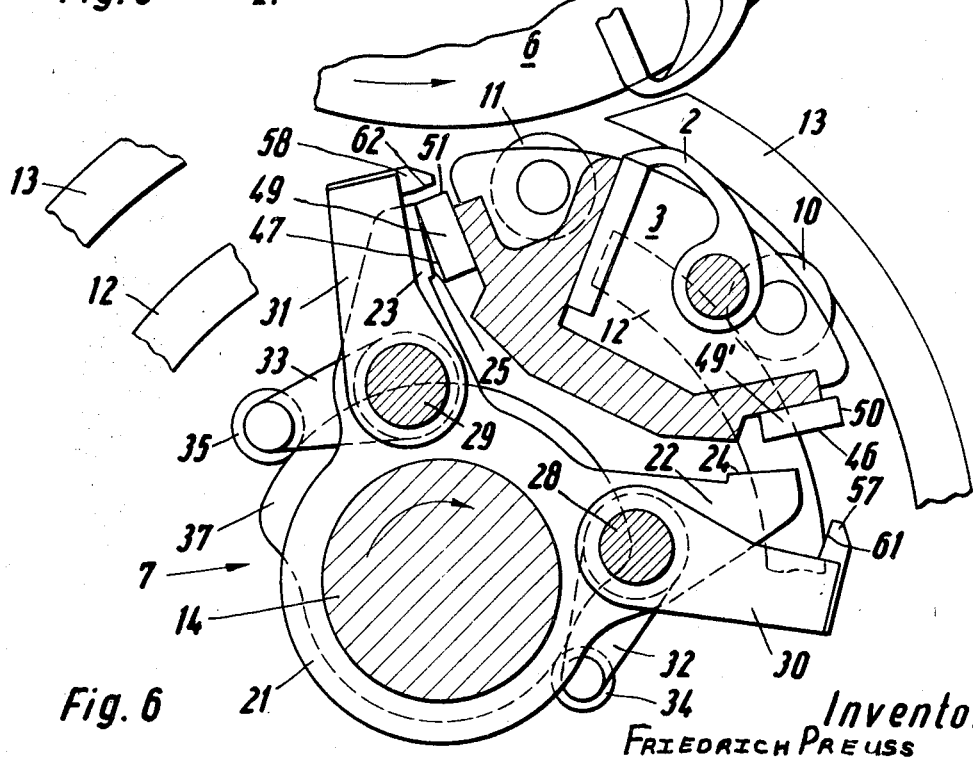
FIG. 6 is a section similar to FIGS. 4 and 5, but showing the gripper carrier just after the transfer of a sheet.

FIG. 5 is evident from the previous description. It shows the sheet transfer device in the position in which the gripper carrier approaches the sheet transfer position. Accordingly, leading clamp 30 is in its clamping position while trailing clamp 31 is still in its open position so that the gripper carrier can locate itself with reference to the aforedescribed locating surfaces 24 and 25 on arms 22 and 23, respectively; and FIG. 6 is also apparent from the previous description. The figure shows the gripper carrier just after completion of the sheet transfer. Accordingly, trailing clamp 31 is still in the clamping position but leading clamp 30 is in its open position so that the gripper carrier can be smoothly guided away from the transfer drum by guide tracks 12 and 13.

As previously explained, the position of the gripper carrier in the circumferential direction can be additionally adjusted by displacing abutment block 57, since the abutment surface 61 of block 57 and the abutment surface 50 of the plate 49' are slanted at the same angle with reference to the direction of displacement of block 57.

What I claim is:

1. A device for delivering sheets of a printing unit of a printing press, said device comprising in combination:
    an endless conveyor;
    at least one carrier carrying at least one sheet gripper mounted on said conveyor;
    a sheet transfer drum fixedly mounted on a rotatable shaft, said gripper carrier being tangentially movable by the conveyor into a predetermined fixed sheet transfer position with reference to the drum to effect transfer of the sheet in said transfer position;
    said carrier and said drum having mating surfaces disposed to engage with each other when the carrier is in said fixed transfer position;
    a leading and a trailing clamp means mounted for movement into and out of a position clamping the carrier to the drum in said fixed transfer position; and
    control means coacting with said clamp means, said control means being activated by rotation of said drum shaft and controlling said clamp means first to effect a movement of the leading clamp means into the clamping position prior to the carrier completing its tangential movement into the transfer position, thereby limiting further tangential movement of the carrier, and then to effect movement of the trailing clamp means into the clamping position thereby locking the carrier to the drum in said fixed transfer position.

2. The device according to claim 1 wherein said control means comprise a stationarily mounted cam means, and a follower for each of said clamp means, said followers moving in unison with the rotation of the drum shaft and riding on said cam means thereby causing sequential movement of the clamp means into and out of the clamping position.

3. The device according to claim 1 wherein said mating surfaces on the carrier and drum are cylindrically curved surfaces engaging each other in the transfer position of the carrier.

4. The device according to claim 1 and comprising adjustment means coacting with the leading clamp means to vary the position of the clamp means in the clamping position thereof, thereby correspondingly varying the transfer position of the carrier.